Jan. 27, 1970  H. HOOVER III  3,492,062
CONTROL OF FLUIDS EXHIBITING AN OPTICAL
DENSITY CHANGE UPON EXPOSURE TO LIGHT
Filed July 11, 1966

HERBERT HOOVER, III
INVENTOR.

BY Lyon & Lyon
ATTORNEYS

United States Patent Office 3,492,062
Patented Jan. 27, 1970

3,492,062
CONTROL OF FLUIDS EXHIBITING AN OPTICAL DENSITY CHANGE UPON EXPOSURE TO LIGHT
Herbert Hoover III, San Marino, Calif., assignor to The Sierracin Corporation, Sylmar, Calif., a corporation of California
Filed July 11, 1966, Ser. No. 564,231
Int. Cl. G02f 1/28, 1/36
U.S. Cl. 350—160                                                        14 Claims

ABSTRACT OF THE DISCLOSURE

There is disclosed herein a process and apparatus by which the properties of phototropic, photochromic and like fluids may be utilized in providing protection from exposure to high intensity radiation while still providing suitable transmission before and after such exposure. A fluid of this nature having a relatively fast reaction time upon exposure to high intensity radiation is retained between relatively transparent window members thereby normally allowing substantially unobstructed transmision through the members and the fluid. A reservoir is coupled with the members to allow the fluid to be withdrawn for recovery of the fluid to a relatively transparent state after an optical density or color change in the fluid. A sealed system is provided to prevent the fluid from contacting the atmosphere. Suitable fluids disclosed are solutions of triphenylmethane dyes used along with enzyme papain. The window members may be formed as goggles, the face plate of a helmet, an airplane windshield, or the like.

This invention relates to the use and control of phototropic or photochromic fluids, and more particularly to a process and apparatus in which the properties of such fluids may be utilized in the protection from exposure to high intensity light while still providing suitable light transmission before and after such exposure.

The term phototropic has been used by scientists for many years in reference to the phenomena of optical density or color change of solids and solutions. Phototropy, or photropism, essentially refers to a reversible change in the color of a substance as a result of an isomeric modification attributable to the influence of radiant energy, particularly light. It is defined by some authorities as the property possessed by certain substances, e.g., the fulguides, of changing color according to the wavelength of incident light, or the loss of color of a dyestuff under the influence of light of a particular wavelength. The substances themselves usually are referred to as being phototropic or photochromic. Although many inorganic compounds have been found to exhibit this property, most of the phototropic substances are organic in nature.

Many investigators have noted this property and suggested various applications therefor. Generally, such applications have been for substances in the solid state since most of the compounds known to be phototropic exhibit the phenamena in the solid state. U.S. Patent No. 2,710,274, for example, discloses a windshield having the property of changing transparency with changes in temperature or luminous intensity reecived thereby. The windshield is formed of two glass sheets with an intermediate film or layer, such as, a layer including a substance which is reversibly photochemically changed upon exposure to light. Some investigators have studied the property of phototropy of solutions. Among the latter are dye derivatives, camphor derivatives, chlorophyl, and enzymes. Air Force Technical Documentary Report No. RTD-TDR-63-4152 dated March, 1964, and entitled "Automatically Responsive Chemical Optical Shutters," discusses the characteristics of several phototropic materials, and suggests a potential application thereof as an automatic optical shutter for protection of aircraft crews from flash blindness as a result of exposure to high intensity light radiation. However, this report further notes that the slow reversal rates have seriously inhibited consideration of a self-reversing light filter. Thus, although some phototropic substances have relatively quick reaction times, i.e., acquire or change color, or increase in optical density quickly, the recovery thereof to a relatively highly transmitting state is relatively slow. Hence, the phototropic substance may provide protection in the event of a high intensity flash, but the substance remains relatively optically dense or opaque preventing visibility until the substance has recovered which may be a relatively long time, at least many seconds or minutes. Furthermore, some phototropic substances are adversely affected or contaminated by contact thereof with the atmosphere.

Accordingly, it is an object of the present invention to enable the properties of a phototropic fluid to be utilized for rapidly blocking light in the event of exposure to high intensity light radiation, while enabling a relatively low denisty optical path to be provided before and substantially immediately following said exposure.

Another object of this invention is to provide a phototropic system wherein a phototropic fluid is retained between transparent members for protection of personnel while allowing visibility therethrough, and by which the phototropic material may be removed in a simple manner after an optical density change therein as a result of exposure to light radiation.

A further object of this invention is to provide means for protecting the eyes of personnel from high intensity radiation by employing a phototropic fluid between transparent members and providing means for withdrawing said fluid to a reservoir after an optical density change in said fluid.

These and other objects and features of the present invention will be better understood upon a further consideration of the following description taken in conjunction with the drawing in which.

Briefly, in accordance with the teachings of the present invention a phototropic or photochromic fluid having a relatively fast reaction time upon exposure to high intensity light radiation is retained between relatively transparent window members thereby normally allowing substantially unobstructed light transmission through the members and the fluid. A reservoir is coupled with the members to allow the fluid to be withdrawn for recovery of the fluid to a relatively transparent state after an optical density, or color, change in the fluid. A sealed system is provided to prevent the fluid from contacting the atmosphere. Examples of suitable fluids are solutions of triphenylmethane dyes used along or with enzyme papain. A wetting agent may be included in the solution to enable a more rapid and uniform change in density or color of the fluid. The window members may be clear or tinted, and made of a plastic material, such as polycarbonate acrylic, or made of a thin "chemically strengthened" glass. These members may be formed as goggles, the face plate of a helmet, an airplane windshield, or the like.

Figure 1:
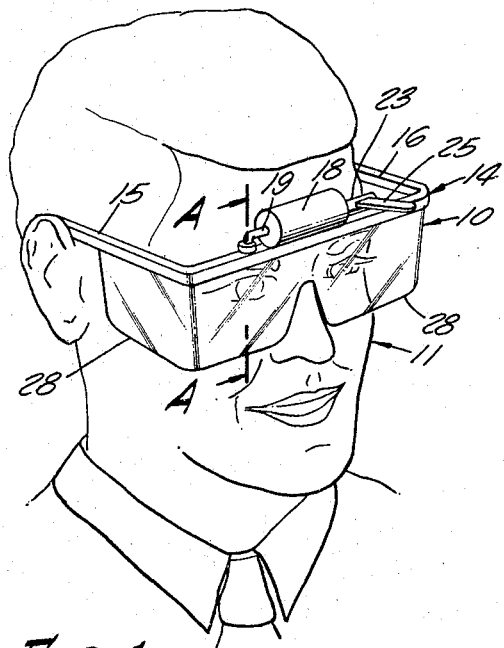
FIGURE 1 is a perspective view of protective spectacles or goggles constructed in accordance with the teachings of the present invention and which may be worn by an individual.
Figure 2:
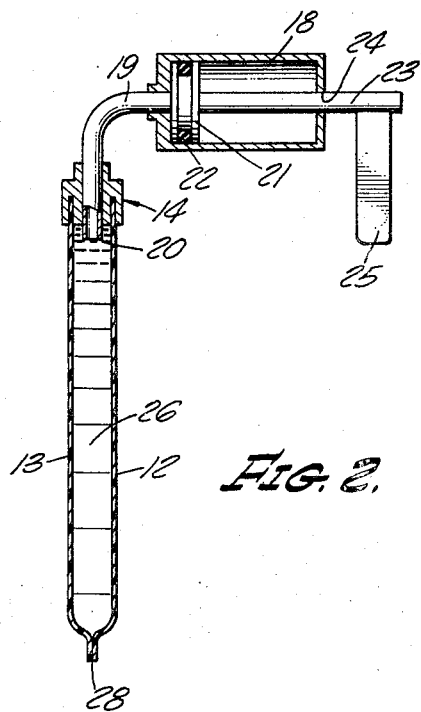
FIGURE 2 is a cross-sectional view of the goggles illustrating a phototropic fluid between a pair of transparent window members and means for withdrawing the fluid to a reservoir.

Referring now to the drawing, FIGURE 1 illustrates protective spectacles or goggles 10 worn by an individual, generally designated by reference numeral 11, for eye protection from exposure to high intensity light radiation. The goggles 10 include a pair of transparent window members 12 and 13, the upper ends of which are secured and sealed with a frame 14. The portion of FIGURE 2 showing the cross-section of the members 12 and 13 and the frame 14 is taken along a line A—A of FIGURE 1. The frame 14 may be generally in the shape of a "U" with the arms or bows 15 and 16 thereof adapted to fit behind the ears of the wearer. The members 12 and 13 preferably follow the configuration of the frame 14 and "wrap around" the eyes of the wearer to ensure protection thereof. A bridge or nose pad (not shown) for protection of the nose may be provided if desired.

Figure 3:
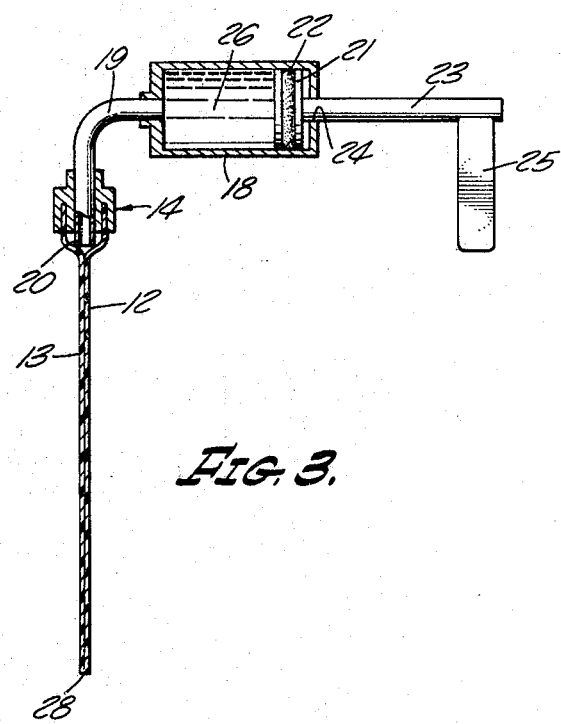
FIGURE 3 is another cross-sectional view of the goggles but illustrating the phototropic material withdrawn into the reservoir.

A reservoir 18 is coupled with the frame 14 through a tube 19 extending through, and secured to, the frame. The lower end 20 of the tube 19 extends into the chamber defined by the members 12 and 13 and the lower portion of the frame 14. The reservoir 18 may be cylindrical with a piston 21 therein having an O-ring 22 mounted in a groove around the periphery of the piston. An actuator rod 23 extends through a hole 24 in the reservoir 18 and is firmly affixed to the piston 21. A handle 25 may be coupled with the rod 23 for facilitating movement of the piston 21 from one end to the other of the reservoir 18. A phototropic or photochromic fluid 26 is provided between the members 12 and 13 and may be withdrawn into the reservoir 18 by movement by the piston 21 to the right as shown in FIGURE 3. In this manner, the piston and reservoir serve to reduce the pressure in the chamber between the members 12 and 13 thereby allowing these members to move together because of the higher atmospheric pressure acting on the exterior thereof to withdraw the fluid into the reservoir 18. If desired, the piston 21 may be larger and include more than one O-ring to effect a better seal between the periphery of the piston and the interior wall of the reservoir 18.

Except for the ends of the members 12 and 13 which are sealed into the frame 14, the peripheral edges of these members are sealed together as indicated at 28. The members 12 and 13 are relatively thin and flexible and have a thickness of one thousandth of an inch or greater, and typically have a thickness of approximately twenty-five thousandths of an inch. These members may be clear or tinted. A suitable plastic material, such as polycarbonate acrylic, is used for the window members. Other relatively transparent plastics may be used as long as they are compatable with the fluid used. In the case of plastic materials, the peripheral edge 28 may be heat-sealed, or preferably a suitable thermal setting adhesive is used to increase the rigidity of the edge 28. Thin "chemically strengthened" glasses, such as those sold under the tradenames "Chemcor" and "Herculite II," may be used for the members 12 and 13. This type of glass may be obtained sufficiently thin and flexible to allow the members 12 and 13 to move together as shown in FIGURE 3 for withdrawal of the fluid. In the case of these glasses, the peripheral edge 28 is sealed by an adhesive. A suitable fluid 26 is a solution of triphenylmethane dye, which has a very sharp response time upon the exposure of high intensity light radiation, used alone or in conjunction with enzyme papain. It will be appreciated that the arrangement described above provides a sealed system and thus prevents oxygen or the atmosphere from contaminating the fluid.

Figure 4:
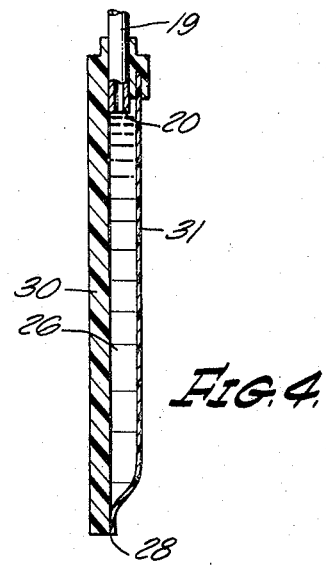
FIGURE 4 is a cross-sectional illustration of an alternative construction for retaining a phototropic fluid between a pair of transparent members.

FIGURE 4 shows an alternative embodiment of the present invention wherein a relatively thick window member 30, which may be integral with the frame, is provided along with a relatively thin window member 31. The member 30 is sufficiently thick to provide rigidity and impact protection, and the member 31 may be considerably thinner, such as one, or several thousandths of an inch thick. This arrangement is particularly suitable for a helmet, or the like, which cannot be removed from the wearer after exposure, and the member 30 may be the conventional faceplate thereof. Furthermore, the member 30 may be an aircraft windshield, or the like. The relatively thin member 31 secured to the member 30 enables the fluid 26 to be retained between these members, and the member 31 is sufficiently thin to allow withdrawal of the fluid to a reservoir.

The fluid 26 allows light transmission therethrough, but the optical density or color thereof rapidly changes upon exposure to light thereby protecting an individual from such exposure. This change typically may take place within several microseconds. After exposure the fluid returns to its original state relatively slowly. However, the fluid then may be withdrawn into the reservoir to enable visibility during recovery of the fluid to its relatively transparent state, after which it may be returned to the chamber between the window members 12 and 13 or 30 and 31.

An additional reservoir, like the reservoir 18, may be coupled with the chamber between the window members. In this case, the fluid after exposure may be withdrawn to the first reservoir for recovery, and then fluid from the second reservoir fed between the window members to immediately provide protection from a subsequent exposure. Furthermore, whether one or two reservoirs are used the window members may be made rigid with the fluid being withdrawn under gas pressure. For example, the fluid may be withdrawn from the bottom of the window members by applying gas pressure at the top, or withdrawn from the top by extending the tube 19 to the bottom of the members. An inert gas is used so as not to adversely affect the fluid.

The present embodiments of the invention are to be considered in all respects as illustrative and not restrictive, the scope of the invention being indicated by the appended claims rather than by the foregoing description, and all changes which come within the meaning and range of equivalency of the claims therefore are intended to be embraced therein.

What is claimed is:

1. Apparatus for providing protection upon exposure to high intensity light comprising:
   first and second relatively transparent window members,
   a frame member, said first and second window members being scured to said frame member and having the remaining peripheral edges thereof sealed together thereby defining a fluid receiving chamber,
   reservoir means coupled with said fluid receiving chamber, and
   a fluid normally retained in said chamber, said fluid being capable of changing optical density to a relatively non-transparent state upon exposure thereof to high intensity light, said reservoir means enabling reduction of the pressure in said chamber for withdrawing substantially all of said fluid from said chamber to said reservoir means after an optical density change of said fluid to said relatively non-transparent state to allow a substantially unrestricted optical path through said window members while said fluid returns to a relatively transparent state.

2. Apparatus as in claim 1 wherein:
said window members comprise a pair of thin sheets formed of plastic material.

3. Apparatus as in claim 1 wherein:
said window members comprise a pair of thin sheets formed of chemically strengthened glass.

4. Apparatus as in claim 1 wherein:
said window members comprise a pair of sheets, one of which has a thickness of between approximately one thousandth and twenty-five thousandths inch.

5. Apparatus as in claim 1 wherein:
a first of said window members is formed of a thick rigid material, and the second of said window members is formed of a relatively thin and flexible material.

6. Apparatus as in claim 1 wherein:
said reservoir means comprises a pair of reservoirs, one for receiving said fluid for recovery after an optical density change, and one for applying a like fluid to said chamber during recovery of said first named fluid.

7. Apparatus as in claim 1 wherein:
said fluid is a phototrophic fluid.

8. Apparatus as in claim 7 wherein:
said fluid is a triphenylmethane dye solution.

9. Apparatus as in claim 7 wherein:
said fluid is a solution of triphenylmethane dye and enzyme papain.

10. Apparatus for providing protection to the eyes of an individual from high intensity light comprising
first and second relatively transparent window members, at least one of said window members being relatively thin and flexible,
a frame member, said first and second window members being secured to said frame member and having the remaining peripheral edges thereof sealed together thereby defining a fluid receiving chamber, said frame member having means for supporting said frame member and said window members on the head of a wearer, said window members being formed to substantially cover the entire field of vision of the eyes of a wearer,
reservoir means coupled with said fluid receiving chamber, and
a fluid normally retained in said chamber, said fluid being capable of changing optical density to a relatively non-transparent state upon exposure thereof to high intensity light, said reservoir means enabling reduction of the pressure in said chamber for withdrawing substantially all of said fluid from said chamber to said reservoir means after an optical density charge of said fluid to said relatively non-transparent state to allow a substantially unrestricted optical path through said window members while said fluid returns to a relatively transparent state.

11. A new use of a phototropic fluid for providing protection from exposure to high intensity light radiation comprising the steps of:
confining said fluid between a pair of relatively transparent window members,
retaining said fluid substantially within the path of vision of an individual to normally allow light transmission to the eyes of said individual through said fluid,
withdrawing substantially all of said fluid to a reservoir after exposure of the fluid to said radiation to provide a substantially transparent optical path to the eyes of said individual through said window members while allowing said fluid to recover to a relatively transparent state, and
repeating said steps of confining and retaining said fluid after it recovers to a reltaively transparent state.

12. A method as in claim 11 wherein:
said fluid is withdrawn to said reservoir by changing the pressure differential applied across said window members causing said window members to move together and force said fluid to said reservoir.

13. A new use of a phototropic fluid for providing protection from exposure to high intensity light radiation comprising the steps of:
confining a first amount of said fluid between a pair of relatively transparent window members,
retaining said amount of fluid substantially within the path of vision of an individual to normally allow light transmission to the eyes of said individual through said fluid,
withdrawing substantially all of said amount of fluid to a reservoir after exposure thereof to said radiation to allow said amount of fluid to recover to a relatively transparent state, and
confining a second amount of fluid between said window members during recovery of said first amount of fluid to a relatively transparent state.

14. A method of providing protection from exposure to high intensity radiation through the use of a fluid which significantly changes in optical density from a relatively transparent state to a relatively nontransparent state upon exposure thereof to such radiation comprising the steps of
confining a quantity of said fluid in the path of vision of an individual when said fluid is in its relatively transparent state between relatively transparent window members, and substantially maintaining said quantity of fluid out of contact with the atmosphere,
subsequently withdrawing said quantity of fluid from between said window members after said fluid changes to its relatively nontransparent state to provide a substantially transparent optical path of vision, and confining said quantity of fluid out of said path of vision while said fluid recovers to its relatively transparent state, and
subsequently confining a quantity of said fluid which is in said relatively transparent state between said window members.

References Cited

UNITED STATES PATENTS

| | | | |
|---|---|---|---|
| 1,515,389 | 11/1924 | Hopkins | 351—44 |
| 2,300,251 | 10/1942 | Flint | 88—57 |
| 2,437,642 | 3/1948 | Henroteau. | |
| 2,576,581 | 11/1951 | Edwards | 88—41 |
| 3,010,109 | 11/1961 | Gray. | |
| 3,370,902 | 2/1968 | Allinikov | 350—160 |

OTHER REFERENCES

Dorion et al., "Photochromism," February 1963, vol. 24, No. 2, pp. 32–35, discovery.

RONALD L. WIBERT, Primary Examiner

P. K. GODWIN, Assistant Examiner

U.S. Cl. X.R.

350—312, 267; 351—44